United States Patent [19]
Gard et al.

[11] Patent Number: 5,405,636
[45] Date of Patent: Apr. 11, 1995

[54] LEAVENING COMPOSITION

[75] Inventors: David R. Gard, Ballwin; Barbara B. Heidolph, Wentzville, both of Mo.

[73] Assignee: Monsanto Company, St. Louis, Mo.

[21] Appl. No.: 138,853

[22] Filed: Oct. 18, 1993

[51] Int. Cl.[6] .............................. A21D 2/02
[52] U.S. Cl. ................... 426/551; 426/549; 426/562; 426/563; 426/565
[58] Field of Search .......... 426/562, 563, 565, 549, 426/551

[56] References Cited

U.S. PATENT DOCUMENTS

| | | |
|---|---|---|
| 1,834,747 | 12/1931 | Stoxes et al. |
| 2,630,372 | 3/1953 | Wright. |
| 3,052,549 | 9/1962 | Kichline et al. |
| 3,501,314 | 3/1970 | Kichline et al. |
| 4,741,917 | 5/1988 | Lauck et al. |
| 4,804,553 | 2/1989 | Tieckelmann. |
| 5,153,018 | 10/1992 | Lajoie et al. ............ 426/562 |

OTHER PUBLICATIONS

Hawley, G. 1981, The Condensed Chemical Dictionary, 10th Ed. Van Nostrand Reinhold Co., New York, p.1.

Primary Examiner—Helen Pratt
Attorney, Agent, or Firm—R. C. Loyer

[57] ABSTRACT

The composition comprises dimagnesium phosphates in combination with a carbonate factor. The dimagnesium phosphates comprise a mixture of dimagnesium phosphates trihydrate, amorphous dimagnesium phosphate and possibly a small amount of dimagnesium pyrophosphate. The dimagnesium phosphates are prepared by removal of water from dimagnesium phosphate trihydrate wherein the weight loss on drying is in the range of from about 10% to about 25% at a temperature in the range of from about 100° C. to about 200° C., depending upon drying conditions.

21 Claims, 5 Drawing Sheets

LEAVENING COMPOSITION

This invention relates to novel leavening compositions and to systems employing such compositions. More particularly, the invention relates to magnesium phosphates exhibiting leavening action as the acid factor in baking preparations.

BACKGROUND OF THE INVENTION

Various salts of the acids of phosphoric acid, usually orthophosphoric acid or pyrophosphoric acid are commonly employed as the acid factor in combination with a carbonate factor in leavening systems. Calcium, aluminum and sodium salts, exhibiting different reaction profiles, find use as leavening acids in different applications. Sodium, aluminum and calcium salts have been widely used as the acid factor in leavening systems.

The use of sodium acid pyrophosphate as an acid factor in bakery leavening is known but an undesirable flavor has been observed. Mixing a calcium acid phosphate salt with sodium acid pyrophosphate (SAPP) has been found to reduce or eliminate the taste and also control the evolution of gas after mixing the baking ingredients. In U.S. Pat. No. 1,834,747 to Stokes et al. there is described baking powder formulas which contain the usual sodium bicarbonate together with alkaline earth metal phosphates such as monocalcium phosphate in admixture with sodium acid pyrophosphate. It is reported that the mixture results in a slowing of the evolution of carbon dioxide as compared to sodium acid pyrophosphate alone thereby allowing a more desirable reaction profile. With variation in the amounts of the various salts it is reported that the evolution of gas during leavening can be controlled to provide varied reaction profiles depending upon the requirements.

Baking powders contain as essential ingredients an acid-reacting material and sodium bicarbonate, with or without a filler. The acid-reacting materials customarily used are alum and acid salts of phosphoric acid, pyrophosphoric acid, or combinations of these materials. See U.S. Pat. Nos. 2,630,372; 3,052,549; and 3,501,314.

Most modern chemical leavening compositions used in baked goods are of the double action type, i.e. they contain a fast-acting acid to release sufficient carbon dioxide quickly enough to provide nucleation of the batter or dough and a good lift during the early stages of baking. A slower or heat activated acid releases additional carbon dioxide during baking before the starch coagulation temperature is reached, maximizing expansion and during the remainder of the baking period to maintain the expansion. The quickly released gas acts before structure has set and is essential to best texture and maximum volume in the finished baked goods. The slowly released gas is essential to maintenance of maximum volume with minimum shrinkage after the baked goods structure has set, i.e., during the middle and last stages of baking.

Previously, the rate of reaction of alkali metal pyrophosphate leavening acids has been modified by blending such acids with an oxide or hydroxide of magnesium. It is reported that such magnesium compounds differ from the previously known reaction modifiers such as calcium compounds in that the magnesium compounds were essentially insoluble. See U.S. Pat. No. 4,741,917 to Lauck et al. According to this patent, magnesium oxide having a particle size of from 1 to 50 microns and a loss on drying of less than 10% is blended with such standard leavening acids as sodium acid pyrophosphate (SAPP). Weight ratios of SAPP to magnesium oxide ranges from 10:1 to 1,000:1. Such modified leavening acids are said to be particularly effective in canned, refrigerated biscuits where low gas generation during mixing, and canning is important. Additional steps of co-milling the SAPP and calcium hydroxide or magnesium oxide followed by heat treating the co-milled product is said to further reduce the rate of reaction of the SAPP at room temperature. See U.S. Pat. No. 4,804,553 to Tieckelmann. The co-milled mixture is thermally treated at 200° C. to 250° C. with or without the presence of moisture in the form of steam. Such treatment is said to reduce the reaction rate of SAPP by as much as 50%, rendering the leavening acid highly desirable for use in canned, refrigerated dough. The SAPP, modified with magnesium oxide, is not a heat activated leavening acid as it still is capable of releasing a large portion of the available carbon dioxide at room temperature if sufficient time is provided.

Leavening acids are selected based upon their profile of carbon dioxide release as a function of time. There are acids which react rapidly upon mixing and release the carbon dioxide while the dough or batter is in the mixing bowl. The fast reacting acids include monocalcium phosphate, fumaric acid, citric acid, adipic acid, potassium tartrate, monoammonium phosphate, and monosodium phosphate. Other acids provide time delayed release of carbon dioxide such as sodium acid pyrophosphate, calcium acid pyrophosphate, gluconodelta-lactone and fumaric acid. Some are activated by temperature. Heat activated leavening acids are known. Those which are considered heat activated are sodium aluminum phosphates, dicalcium phosphate dihydrate, aluminum sulfate and sodium aluminum sulfate. All leavening acid reactivities are increased in rate with the exposure to heat. The heat activated acids, however, do not react significantly at room temperature. Alternatives to the sodium heat activated salts have been attempted but there is usually a disadvantage associated with them. For example, the dicalcium phosphate dihydrate reacts too slowly to provide leavening in the early phases of baking. Other calcium salts have not demonstrated heat activation. The dimagnesium phosphate trihydrate does provide leavening on its own; however, the profile of release is not optimum for use alone.

There is needed a suitable alternative to the sodium heat activated leavening salts.

BRIEF DESCRIPTION OF THE INVENTION

In accordance with this invention there is provided as a novel leavening acid a mixture of dimagnesium phosphates and leavening compositions comprising a carbonate factor and said mixture of dimagnesium phosphates. Such compositions exhibit heat activated leavening and can be prepared in various forms such as dough, batter and dry mixes. Heat activated leavening as used in this application and claims means that a substantial release of carbon dioxide does not occur in a dough or batter at ambient temperature. However, substantial carbon dioxide release occurs during the baking operation thereby providing the baked product with light texture.

The leavening acid of this invention provides both magnesium and phosphorus. Magnesium and phosphorus are two of the three minerals for which there are recommendations on intake (US RDA) by the National Research Council (NRC). According to the NRC, the average intake of magnesium has tended to decline in the U.S. Per capita intake of magnesium in the U.S. food supply was 408 mg/day during the period of 1909 to 1913. By 1949 the amount had declined to 368 mg/day. The amount reported in 1980 was 349 mg/day. Therefore, the leavening agent of this invention provides essential magnesium and phosphorus for the human diet.

It has been discovered that the mixture of dimagnesium phosphates of this invention, when employed as the acid factor in a leavening system, provides leavening action with commonly available carbonate factors such as sodium, potassium or ammonium bicarbonate. Upon baking the release of carbon dioxide in adequate amounts provides timely leavening.

Dicalcium phosphate is the calcium salt analog to dimagnesium phosphate. Although the dihydrate form of dicalcium phosphate demonstrates very high temperature heat activation, i.e., greater than 135 F., equivalent carbon dioxide release is not observed for dimagnesium phosphate trihydrate. The dimagnesium phosphate trihydrate provides some leavening action, but has proven to release insufficient carbon dioxide prior to starch gelatinization and set. The anhydrous form of dicalcium phosphate on the other hand, does not provide carbon dioxide release at temperatures low enough to be practical in baking systems. From the above, it is evident that leavening capability of the magnesium analogues of calcium phosphates cannot be predicted on the basis of known capabilities of the calcium salts. In the case of the hydrate it has now been discovered that the effects in leavening are opposite.

The dimagnesium phosphates of this invention are prepared by adding a magnesium cation source such as magnesium oxide, hydroxide or suitable salt such as magnesium sulfate to phosphate ion source such as orthophosphoric acid or a suitable salt such as the sodium orthophosphates. Dimagnesium phosphate trihydrate is thus produced in crystalline form. Phase diagrams are published which give the temperature and concentrations of the magnesium and phosphate required for crystallization of dimagnesium phosphate trihydrate. Examples of such publications are "Physiochemical Researches in the Field of Magnesium Phosphates" (the system $MgO-P_2O_5-H_2O$ at 25° and 80°), Journal of Applied Chemistry, 23, 873 (1950) and "The Polytherm of the Ternary System $MgO-P_2O_5-H_2$)", Journal of Applied Chemistry, 24, 439–447, both publications by A. P. Beloplsky, S. Ya Shpunt and M. N. Shulgine. In accordance with this invention, the trihydrate is partially dried to provide a mixture of the trihydrate and amorphous magnesium phosphate and possibly magnesium pyrophosphate. Such mixture is referred to as dimagnesium phosphates in this specification and claims.

Water removal from the dimagnesium trihydrate is usually controlled so as to produce a minimum amount of magnesium pyrophosphate, i.e., less than 5% by weight of the total $P_2O_5$ content. While a small amount of leavening is contributed by the dimagnesium trihydrate, major leavening action is related to the presence of substantial amounts of the amorphous dimagnesium phosphate. As the trihydrate is dried there appears to be a conversion of some of the material into the pyrophosphate state but the presence of such material in small amounts does not deleteriously affect the leavening performance of the mixture. As pyrophosphate forms, more amorphous dimagnesium phosphate is converted from the trihydrate. If the dimagnesium trihydrate crystals are not formed in small size, they may be ground to a fine particle size and then dried or the dried mixture may be ground to suitable particle size.

In accordance with this invention there is provided dimagnesium phosphates comprising dimagnesium phosphate trihydrate, amorphous dimagnesium phosphate and small amounts of magnesium pyrophosphate. The dimagnesium phosphates of this invention contain from about 33 percent to about 66 percent amorphous dimagnesium phosphate.

DETAILED DESCRIPTION OF THE INVENTION

Figure 1:
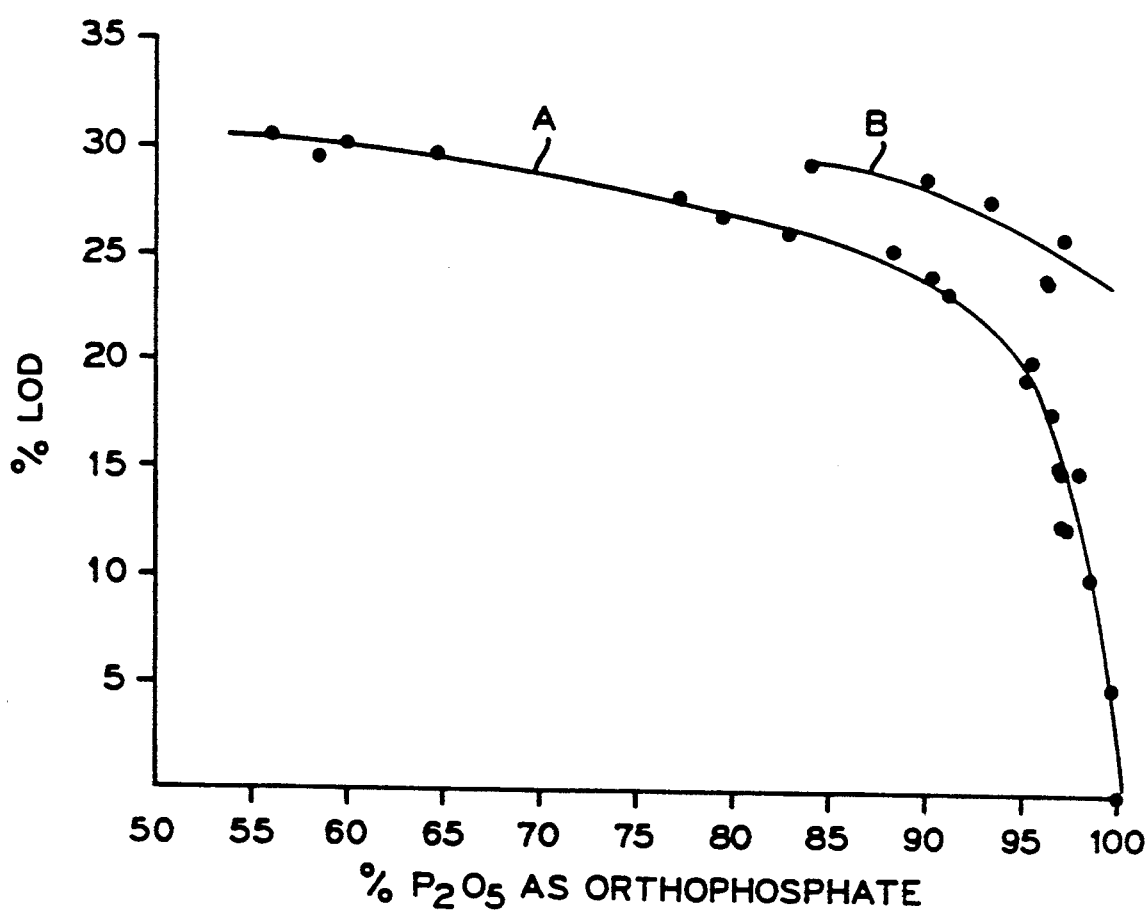
FIG. 1 is a graph showing the relationship between the amount of $P_2O_5$ as orthophosphate upon drying of the dimagnesium phosphate trihydrate as a function of percent weight loss on drying (LOD) both under ambient pressure (Curve A) and under reduced water vapor pressure (Curve B).

The dimagnesium phosphates of this invention are obtained by controlled removal of water from dimagnesium phosphate trihydrate prepared in conventional manner as pointed out above. The crystalline trihydrate product is usually separated from the reaction mixture by conventional means such as filtration or centrifugation but in some instances the entire mixture may be dried without separation of the solids. Drying means include drum and spray driers. If the trihydrate crystals are separated from the rection mixture in which they are produced drying means such as rotary or tray dryers may be employed.

Water removal is controlled by measuring the weight loss of the starting trihydrate or measuring the weight loss on ignition of the dried material. It has been found that excessive drying or harsh drying conditions produces larger amounts of undesired pyrophosphate. As pyrophosphate forms, more of the active material, amorphous dimagnesium phosphate, is converted from the trihydrate. However for most food uses, it is desirable to minimize the pyrophosphate content which is usually less than about 5% by weight of the total $P_2O_5$ content of the product.

Removal of water from the dimagnesium phosphate trihydrate at atmospheric pressure takes place at a temperature above about 100° C. If lower water vapor pressure is employed such as by drying under a vacuum or reduced pressure more rapid rates of water removal are obtained at any given temperature and reduced amounts of pyrophosphate results. Such operation allows for lower drying temperatures such as in the range of about 115° C. to about 140° C. At ambient pressure drying temperatures are more typically in the range of from about 140° C. to about 200° C.

Satisfactory control of the amount of pyrophosphate formed during water removal at ambient pressure is achieved by controlling weight loss on drying of up to about 20%. Under reduced pressure and lower drying temperature weight loss in the range of up to about 25% can be achieved without producing undesirable amounts of pyrophosphate (less than about 5% of $P_2O_5$ content). Excessive amounts of pyrophosphate results in an undesirable amount of non-leavening material in the mixture.

Alternatively, control of the drying process can be achieved by measuring residual water after drying. In one embodiment, the amount of water remaining in the dimagnesium phosphates of this invention is measured by ignition and determining the percentage weight loss on ignition (LOI). According to the molecular formula for the dimagnesium trihydrate, percent loss on ingition or loss on drying, as defined above, are related in the range of percent LOI=(36.37-%LOD)/(100-%LOD). Typical LOI when drying under ambient pressure is up to about 20% and when drying under reduced water vapor pressure LOI can be up to about 15%.

Either before, during or after removing some of the water from the trihydrate, the particle size of the resulting dimagnesium phosphates is reduced if required. Particle size reduction may be accomplished, for example, by crushing, grinding, milling, and/or screening. Typically the particle size found most useful is below about 44 microns. Reduction to a smaller size is performed if the dimagnesium phosphate particles are substantially above 44 microns.

The dried, sized dimagnesium phosphates of this invention are employed as the acid factor in leavening systems in typical application with a carbonate factor. Carbonate factors include any suitable basic materials such as sodium bicarbonate as well as other basic materials such as potassium bicarbonate, amorphous calcium carbonate, ammonium bicarbonate, or encapsulated bicarbonate and the like.

It has been found that approximately 250 parts, by weight, of the dimagnesium phosphates of this invention is employed to neutralize 100 parts, by weight, sodium bicarbonate. Appropriate amounts of the dimagnesium phosphates useful in various leavening systems are easily calculated in view of the above. Other amounts may be employed to provide particular desired finished product characteristics. Suitable weight ratios of the leavening acid of this invention to several carbonate factors is in the range of from about 2.0:1 to about 3.33:1, preferably from about 2.22:1 to about 3.03:1 for most baked goods.

There is provided chemical leavening systems for baked goods in accordance with this invention by combining leavening acid of this invention as the acid factor with a suitable carbonate factor. Carbonate factors useful in accordance with this invention are those previously known.

The dimagnesium phosphates of this invention can be employed in admixture with other previously known leavening acids which include, without limitation, monosodium dihydrogen phosphate; sodium aluminum phosphate acidic; a mixture of sodium aluminum phosphate acidic with aluminum sulphate anhydrous; a mixture of sodium aluminum phosphate acidic with anhydrous coated monocalcium phosphate; monocalcium phosphate; dicalcium phosphate dihydrate, anhydrous monocalcium phosphate, coated; monoammonium phosphate; diammonium phosphate; sodium acid pyrophosphate; monosodium phosphate; monosodium phosphate and sodium acid pyrophosphate blends; citric acid; adipic acid; mixtures of monocalcium phosphate and sodium acid pyrophosphate; mixtures of sodium aluminum sulphate and monocalcium phosphate; monocalcium phosphate, anhydrous; fumaric acid; monocalcium phosphate and sodium aluminum phosphate mixtures; glucono-Δ-lactone; monopotassium tartrate; sodium aluminum sulfate; aluminum sulfate and any other suitable, edible, non-toxic acid. Further, coated or encapsulated acids are useful. Typical coatings known in the art are fats, maltodextrin, etc.

The chemical leavening system of this invention may be incorporated into a baking powder product conveniently prepared by admixing leavening acid of this invention with a carbonate factor as a dry powder mix. It is well known that baking powders in the dry powder form are best prepared together with fillers contributing to the bulk of the powder and aiding its measurement for actual use. Fillers such as starch or calcium carbonate are generally employed in baking powders of this invention. Conventional preservatives and fillers may be employed together with the baking powder composition of this invention as is known in the art.

Fresh dough, dry mixes and batter can be prepared from the leavening systems of this invention in the conventional manner as has been practiced in the art. Typically the ingredients may be dry mixed or prepared as a dough or batter. The dough or batter may be stored for conventional time periods (under refrigeration or frozen). The dry mix is employed to prepare fresh dough or batter by incorporating suitable liquids such as milk and solids such as shortening materials as is known in the art. It is obvious from the above that substitution or replacement of conventional sodium salts with the dimagnesium phosphates of this invention will reduce the amount of dietary sodium and fortify with magenisum.

As is known in the art, the desired pH of the final baked good can be controlled by incorporating into fresh dough or batter leavening acids and alkaline carbonate sources normally employed for that purpose in the art. Generally, the pH of the final baked product ranges from about 5.5 to about 9.0, (preferably from about 6.9 to about 7.5). The amount of alkaline carbonate material added should provide sufficient carbon dioxide. Typically there is included from about 0.3% by weight to about 3% by weight of the edible, alkaline agent, based upon the weight of the dry ingredients employed.

The typical uses and levels of leavening acid of this invention typically employed therein are provided in the table below. The listed baked goods are representative only and not intended to limit the invention in any way as other uses and baked goods can be made from the leavening system of this invention. The level of acid used with common, commercially available carbonate factors is an amount sufficient to neutralize and liberate carbon dioxide. The percentages shown are for the amount of dimagnesium phosphates of this invention.

| USES AND LEVELS OF USE - DIMAGNESIUM PHOSPHATES | |
| --- | --- |
| PRODUCT | WT. PERCENT |
| Self-Rising Flour-Like Product | 2.4–4.3 |
| Self-Rising Corn Meal-Like Product | 3.0–5.7 |
| Biscuit Mixes | 3.0–5.7 |
| Breading/Batter Mixes | 0.0–5.7 |
| Cake Mixes - Layer | 1.2–2.9 |
| Cake Mixes - Angel | 3.0–5.7 |
| Cake Doughnut Mixes | 1.0–2.9 |
| Cookie Mixes | 0.0–2.0 |
| Hush Puppy Mixes | 3.0–5.7 |
| Pancake Mixes | 3.0–5.7 |
| Pizza Mixes | 0.6–3.4 |
| Refrigerated Doughs | 4.0–7.1* |
| Frozen Pancake Batter | 3.4–6.3* |
| Frozen Biscuit Doughs | 3.0–5.7* |
| Muffins | 3.0–5.7 |
| Baking Powders | 42.0–60.0 |
| Crackers | 1.0–5.14 |
| Waffle Mixes | 4.0–5.7 |
| Frozen Cake Batter | 1.2–3.6* |

*% of solids

The moisture content of the fresh doughs and batters of the present invention generally range from about 5% by weight to about 130% by weight, based upon the weight of the dry ingredients. The moisture content will vary, dependent upon the ultimate utility of the dough or batter as to whether it may be employed to prepare cookies, biscuits, cakes, etc.

Baking times of the fresh doughs or batter of this invention are generally within the baking times generally known in the art with respect to the use of previously known leavening systems. It is typical that various mixes of fresh dough or batter will require different baking times considering as well the baking characteristics of the ovens employed. Typical baking times range from 7 to 15 minutes for cookies and longer periods for biscuits and other baked goods. The doughs or batters of the present invention are formed into pieces or deposited in conventional manner, using known bakery equipment such as wire cutting devices, rotary cutters, reciprocating cutters, and the like.

Typically, fresh dough and batter are prepared as in the prior art from flour, shortening, sugar, optionally emulsifiers and preservatives and from about 0.5% by weight to about 7.1% by weight of the leavening acid of this invention and appropriate levels of a carbonate source. Other optional ingredients, of course, can be included as is well known in the art.

The fresh doughs and batters of the present invention can optionally include many substances known in the art to be added to fresh dough and batter including bulking agents such as dietary fiber and hydrocolloides, corn fiber, soy filtrate, wheat bran, and apple tomace fiber (dehydrated and freeze dried) as exemplary of dietary fibers.

Texturizing and flavoring ingredients conventionally used in the production of baked goods may be employed in the novel doughs of this invention. The amounts employed are generally comparable to those used in the conventional formulation so as to achieve satisfactory mouthfeel, texture and taste. Typical amounts of conventional texturizing and flavoring ingredients used in the production of baked goods are in the range of from about 5% by weight up to about 25% by weight of the fresh dough or batter. Other additives such as sweeteners, etc. can also be employed in combination with the novel leavening system of this invention.

DESCRIPTION OF THE PREFERRED EMBODIMENTS

Example 1

The dimagnesium phosphates of this invention were prepared by heating 600 g of reagent grade 85% phosphoric acid and 742 g of water in a glass beaker to 80° C. ±10° C. with stirring. Magnesium oxide, 204 g, was added slowly over a period of about 1 hour. Stirring continued for about 30 minutes after the addition of magnesium oxide was completed. Precipitation of crystals occurred which were separated from the reaction mixture by filtration. The crystals were washed sequentially with ethanol and acetone.

The dimagnesium phosphate trihydrate is dried by spreading the material in a Petri dish and placing the dish in a drying oven at the desired temperature. Drying time and temperature are coordinated so as to avoid the production of excessive amount of pyrophosphate. The process of drying is followed by determining weight loss.

Example 2

The dimagnesium phosphates of this invention as well as samples of dimagnesium phosphate trihydrate were tested as the acid factor in a leavening system of a pancake batter. A pancake batter was prepared as follows:

To a bowl was added about 174 g of Roland Pancake Base Mix. Separately, 3.94 g of sodium bicarbonate and an amount of leavening agent shown below in Table I were placed into a tared boat. The mixture of leavening acid and soda were sprinkled over the mix and incorporated with a whisk. Then 197.6 g of water were added to the mix and blended with a whisk.

The amount of dimagnesium phosphate trihydrate and dimagnesium phosphates employed in a bake test utilizing the pancake batter was based upon estimated neutralizing value (NV). The estimated NV and the weight in grams employed for each sample tested is listed below in Table I. The weight of the dimagnesium phosphates used is proportional to the active hydrogen content of the dimagnesium phosphates. In the following tables Sample 1 is dimagnesium phosphate trihydrate and the other samples are the dimagnesium phosphates of this invention as described below in Table I.

TABLE I

| Sample | NV | Weight |
| --- | --- | --- |
| 1 | 33 | 11.94 |
| 2 | 35 | 11.26 |
| 3 | 38 | 10.37 |
| 4 | 39 | 10.10 |
| 5 | 40 | 9.84 |
| 6 | 40 | 9.84 |
| 7 | 40 | 9.84 |
| 8 | 39 | 10.10 |
| 9 | 31 | 12.71 |

Various samples prepared as described in Example 1 above were dried at different temperatures and times as noted in Table II below. In Table II the amount of pyrophosphate produced during the drying step is noted along with particle size of the material.

In the pancake bake test a level #24 scoop of batter was employed to make pancakes for the tests reported in Table II below. The batter was poured onto a heated griddle maintained at 375° F. making eight pancakes. The pancakes were baked for 1.5 minutes and then turned over and baked for an additional 1.5 minutes. After baking they were removed from the griddle and evaluated. The results of such tests are shown in Table II below. Portions of the trihydrate prepared as in Example 1 were dried at various times and temperatures as shown below in Table II. The percent weight loss on drying of each sample is also provided in Table II as well as the detected amount of pyrophosphate in each sample. The trihydrate and dried samples were ground to pass through various screen sizes as indicated in Table II. Also listed is the volume mean diameter of each sample. In Table II, where no particle size is given, the material was used as produced, without size reduction.

The texture of the pancakes is reported in Table II below. To determine texture, a stack of 3 pancakes were subjected to a probe traveling at 1.5 mm/sec. under a weight of 212 g. The distance the probe became embedded into the stack of pancakes under said weight was measured in millimeters (Texture). Texture, in turn, is related to tenderness of the baked good which is an indication of the amount of leavening. The greater the texture number, the greater the tenderness. A texture of at least 9.0 mm, preferably at least 10.0 mm, is considered satisfactory leavening. The above mentioned test results and data appear in Table II below wherein texture is reported in mm.

A sample of the pancake batter was also taken to test volume increase without heating. Into a 100 ml graduated cylinder was added about 50 ml of the batter. The volume in the cylinder was noted after 30 minutes to determine whether there was any expansion. The observed initial volume in the graduated cylinder is subtracted from the volume observed at 30 minutes. The difference is divided by the initial volume to determine the percentage of expansion at 30 minutes. The percentage expansion in the graduated cylinder is also shown in Table II below. Sample No. 12 is a control sample containing only the carbonate factor and no leavening acid. In Table II mesh size is in USSS Screen Mesh and particle size is given as the volume mean diameter in microns.

TABLE II

| Sample No | Drying Temp °C. | % Wt Loss | % Pyro | Thru Mesh | Part. Size | 30 min. % Batter Expan. | Texture |
|---|---|---|---|---|---|---|---|
| 1A | — | 0 | 0 | — | 128* | 3.0 | 6.1 |
| 1B | — | 0 | 0 | −200 | 40 | −0.5 | 6.5 |
| 1C | — | 0 | 0 | −325 | 28 | −2.0 | 6.6 |
| 2 | 147 | 5.0 | 0.4 | −325 | 28 | 2.0 | 9.7 |
| 3A | 147 | 10.1 | 1.6 | −200 | 45 | −0.8 | 12.3 |
| 3B | 147 | 10.1 | 1.6 | −325 | 29 | 1.5 | 11.5 |
| 4 | 147 | 12.5 | 3.1 | −325 | 28 | 1.0 | 10.9 |
| 5A | 147 | 15.2 | 3.2 | — | 128* | 11.0 | 11.5 |
| 5B | 147 | 15.2 | 3.2 | −100 | 61 | 4.0 | 12.5 |
| 5C | 147 | 15.2 | 3.2 | −200 | 50 | 5.0 | 13.3 |
| 5D | 147 | 15.2 | 3.2 | −325 | 29 | 4.8 | 14.2 |
| 6 | 147 | 17.7 | 3.6 | −325 | 28 | 6.9 | 14.3 |
| 7A | 147 | 20.1 | 4.6 | −200 | 45 | 10.0 | 13.4 |
| 7B | 147 | 20.1 | 4.6 | −325 | 27 | 11.1 | 14.2 |
| 8 | 147 | 25.3 | 11.8 | −325 | 27 | 7.8 | 15.0 |
| 9A | 169 | 29.5 | 41.4 | — | 128* | 4.0 | 9.2 |
| 9B | 169 | 29.5 | 41.4 | −200 | 49 | 0.0 | 10.8 |
| 9C | 169 | 29.5 | 41.4 | −325 | 29 | −1.0 | 9.6 |
| 10 | 120 vac | 23.6 | 3.8 | — | — | 13.7 | 11.4 |
| 10A | 120 vac | 23.6 | 3.8 | −325 | — | 20.0 | 12.6 |
| 11A | 175 | 15.2 | 3.1 | −325 | 27 | 4.8 | 14.2 |
| 11B | 200 | 2.2 | −325 | −325 | 27 | 4.0 | 12.3 |

TABLE II-continued

| Sample No | Drying Temp °C. | % Wt Loss | % Pyro | Thru Mesh | Part. Size | 30 min. % Batter Expan. | Texture |
|---|---|---|---|---|---|---|---|
| 12 | — | — | — | — | — | 4.0 | 7.0 |

*denotes not sized.

Various samples of the product of Example I were dried under either ambient atmospheric pressure or under vacuum at various temperatures. The loss on drying (LOD) was determined for each sample as well as the amount of $P_2O_5$ as orthophosphate. The data appears in Table III below and is graphically shown in FIG. 1.

TABLE III

| Sample No. | TEMP, C. | % Ortho | % LOD |
|---|---|---|---|
| Dry Under Ambient Atmosphere ||||
| 1A, 1B, 1C | unheated | 100 | 0 |
| 2 | 147 | 99.6 | 5 |
| 3A, 3B | 147 | 98.4 | 10.1 |
| 4 | 147 | 96.9 | 12.5 |
| 5A–5D | 147 | 96.8 | 15.2 |
| 6 | 147 | 96.4 | 17.7 |
| 7A, 7B | 147 | 95.4 | 20.1 |
| 8 | 147 | 88.2 | 25.3 |
| 9A–9C | 147 | 58.6 | 29.5 |
| 11A | 175 | 96.9 | 15.2 |
| 11B | 200 | 97.8 | 15 |
| 12 | 225 | 56.2 | 30.51 |
| 13 | 210 | 64.7 | 29.63 |
| 14 | 210 | 60.1 | 30.15 |
| 15 | 188 | 77.2 | 27.72 |
| 16 | 143 | 97.2 | 12.39 |
| 17 | 143 | 90.2 | 24.1 |
| 18 | 145 | 79.4 | 26.89 |
| 19 | 160 | 91 | 23.25 |
| 20 | 160 | 82.8 | 26.12 |
| 21 | 145 | 96.9 | 15 |
| 22 | 150 | 95.1 | 19.28 |
| Dry Under Vacuum ||||
| 23 | 105 | 97 | 25.98 |
| 24 | 105 | 93.2 | 27.65 |
| 25 | 138 | 89.9 | 28.61 |
| 26 | 138 | 84 | 29.24 |
| 27 | 138 | 96.2 | 23.79 |
| 28 | 120 | 96.2 | 23.6 |

Figure 2:
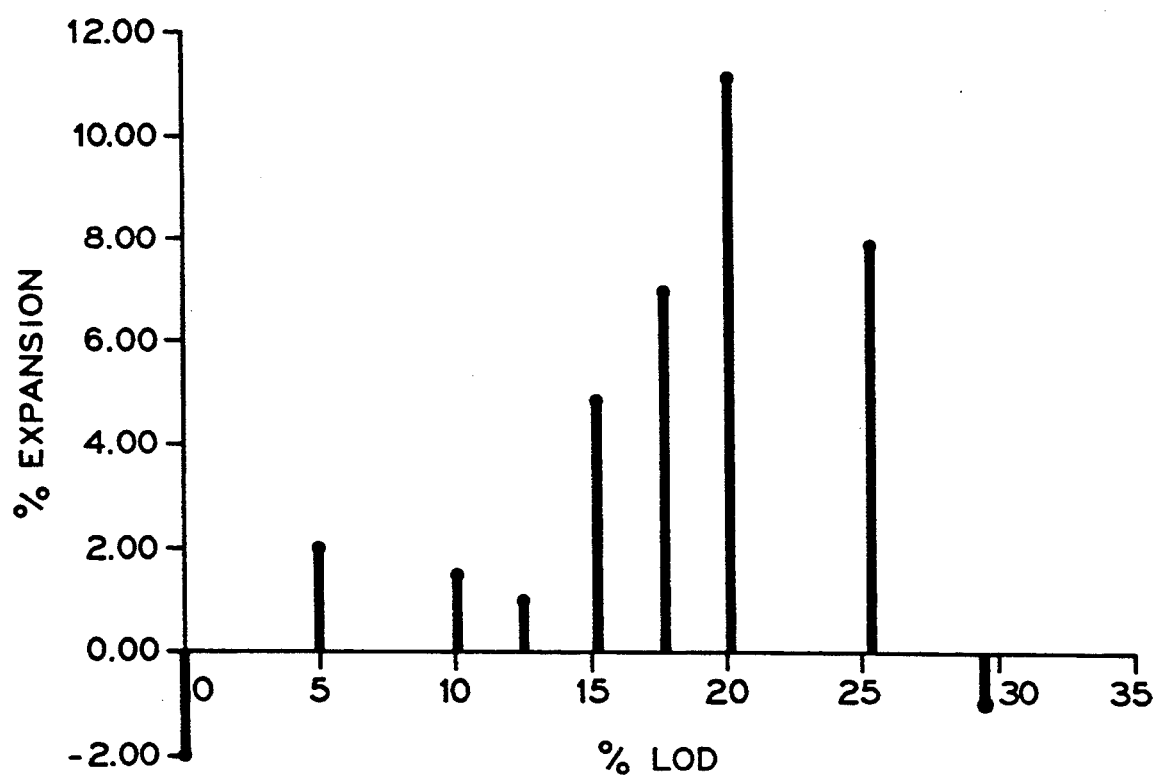
FIG. 2 is a graph showing the relationship between the amount of expansion of a pancake batter produced by the dimagnesium phosphates of this invention in a bench test as a function of percent loss of weight on drying (LOD) of the dimagnesium trihydrate.

In FIG. 2 there is shown a graph plotting the loss on drying against the percent expansion after 30 minutes in a graduated cylinder as reported in Table II above for Samples 1C, 2, 3B, 4, 5D, 6, 7B, 8 and 9C (all dried under ambient pressure and passing through a screen with openings of 44 microns). It can be seen from the data in FIG. 2 that the batter expansion generally increases with increasing percent LOD up to about 20 percent LOD after which the batter expansion decreases with increasing percent LOD.

Figure 3:
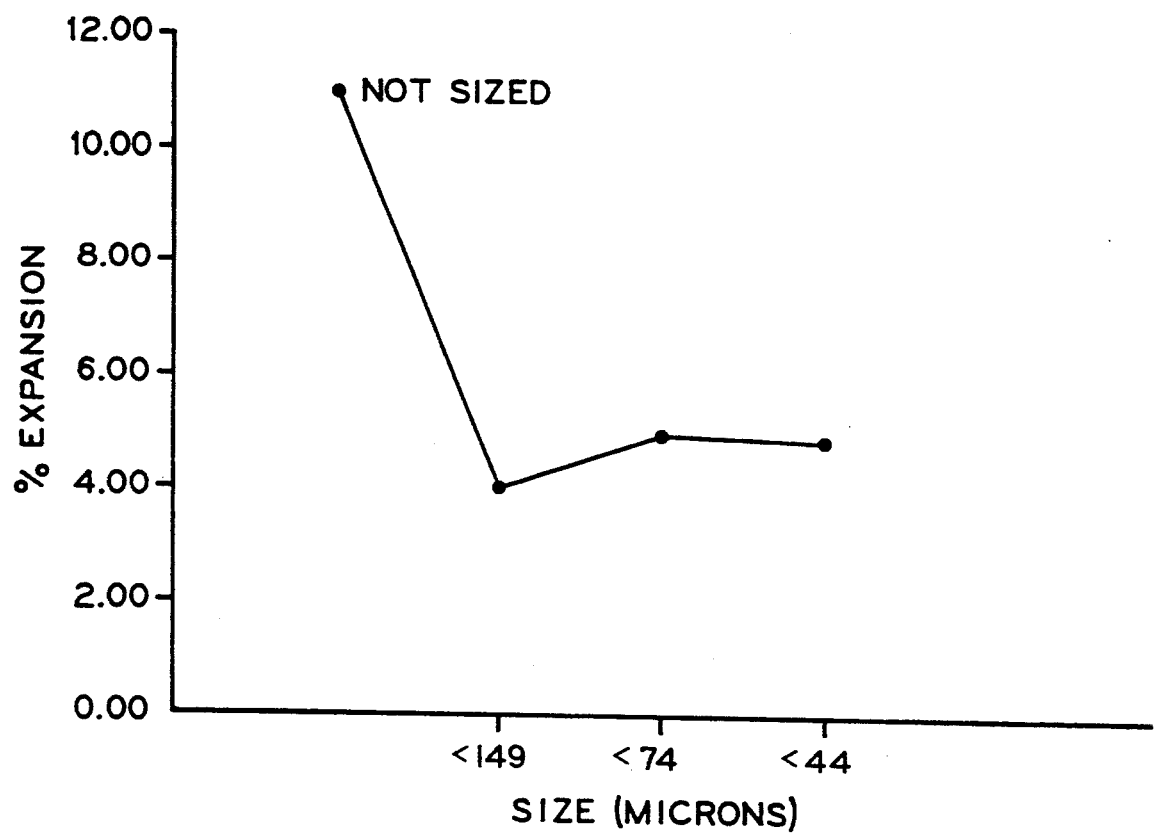
FIG. 3 is a graph showing the relationship between the amount of expansion of a pancake batter in a bench test produced by the dimagnesium phosphates of this invention and their maximum particle size

Particle size effect in the bench test showing the amount of expansion in the graduated cylinder as noted above is shown in FIG. 3. These data show that lowered expansion at room temperature is obtained with reduced particle size. Data is shown in FIG. 3 from Table II, Sample Nos. 5A–D.

Figure 4:
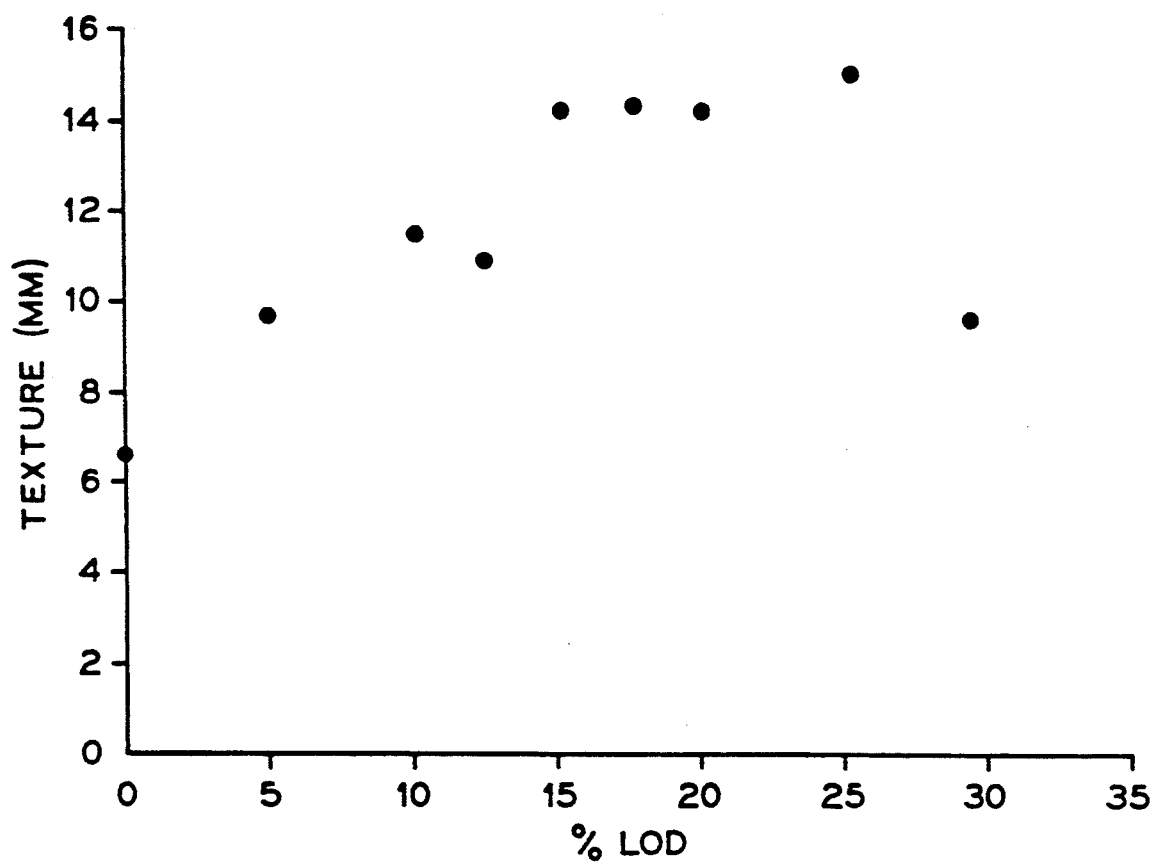
FIG. 4 is a graph showing the relationship between the texture/tenderness of a sample baked good (pancakes) leavened with the dimagnesium phosphates of this invention and the percent weight loss on drying (LOD) of the dimagnesium phosphate trihydrate to produce said leavening acid.

The texture data of samples dried under ambient pressure and then ground to a particle size of −325 mesh as shown in Table II were compared on the basis of the loss on drying in FIG. 4. It is shown in FIG. 4 that, with constant particle size, optimum texture was obtained with an LOD in the range of from about 15% to about 25%.

Figure 5:
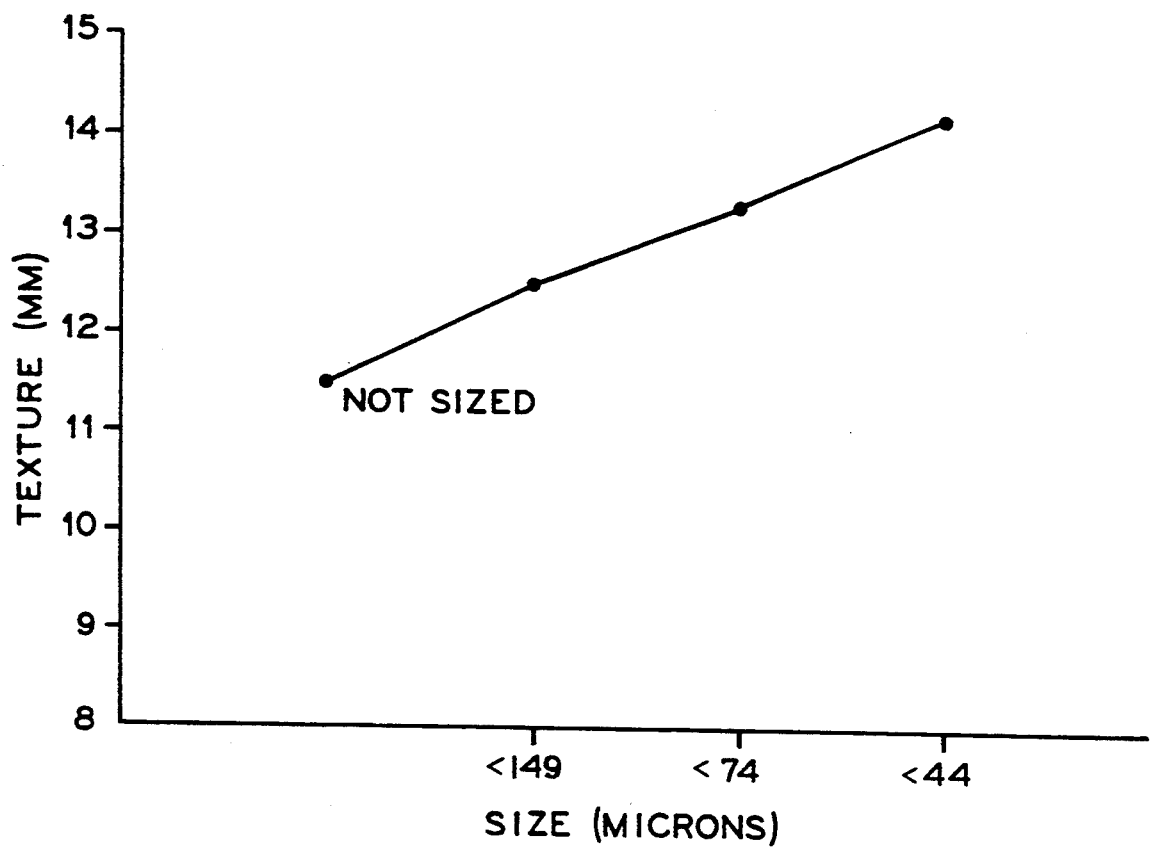
FIG. 5 is a graph showing the relationship between the texture/tenderness of a representative baked good (pancakes) leavened with the dimagnesium phosphates of this invention and the maximum particle size of said leavening acid (mm).

The texture data presented in Table II above for Sample Nos. 5A–D is shown in FIG. 5 plotted against particle size. It is noted that these samples had an LOD of 15.2. These data show that improvement in texture is obtained by decreasing the particle size of the dimagnesium phosphates of this invention.

From the above data is seen that the dimagnesium phosphates of this invention are heat activated and that optimum texture of the baked pancake is achieved with those samples prepared by drying to about 15% weight loss. The small amount of pyrophosphate does not seem to influence the performance of the dimagnesium phosphates of this invention. The pancakes exhibited acceptable taste and mouth feel.

In the following example, 3, 4 and 5, the dimagnesium phosphates of this invention were dried to 15% LOD and sized to pass a screen having 44 micron openings.

Example 3

The dimagnesium phosphates of this invention were tested as the acid factor in a leavening system of a muffin mix. A commercially available blueberry muffin mix from Continental Mills, Inc. (Lot No. 6-3014, without leavening system), was prepared as follows:

To a mixing bowl was added about 287.47 g of Continental Mills Blueberry Muffin Mix. Separately, 3.38 g of sodium bicarbonate, 0.44 g of monocalcium phosphate, anhydrous commercially available under the trade name Py-Ran from Monsanto Company and 2.5 g of dimagnesium phosphates of this invention (15% LOD, NV 40 substantially less than or equal to 44 microns particle size) were placed into a tared boat. The mixture of leavening acids and soda were sprinkled over the mix and incorporated with a whisk (20 strokes). Then 117 g of water and one fresh egg were added to the mix and blended by stirring with a spoon until the liquid moistened the dry ingredients.

Into four paper cups in a muffin tin were poured an equally divided 190.67 g of batter. The remaining batter was placed into 5 additional cups. All cups were about half full. The muffins were baked at 400° F. for about 16 minutes. After baking the four evenly measured muffins were analyzed as noted below in Table IV according to the procedures described above in Example 2. Texture was measured two ways, through the top crust and then by cutting off the crown of the muffins and measuring at the crust surface of the lower half. Employing a universal indicator, the pH of the muffins was determined to be 7.5. Batter specific gravity was 1.007 g/cc. Height of each individual muffin was measured with a caliper. Specific volume of the four muffins was determined using a rapeseed volume displacement apparatus to determine the volume. Lightness was also determined by the rapeseed volume displacement apparatus. The data obtained by the procedures described above are noted in Table IV below.

TABLE IV

| Muffin | No. 1 | No. 2 | No. 3 | No. 4 |
|---|---|---|---|---|
| Texture (crust) | 2.5 | 3.2 | 3.1 | 2.3 |
| Texture (Crust) | 2.5 | 3.0 | 2.8 | 2.8 |
| Height (cm.) | 4.8 | 4.8 | 4.5 | 4.4 |
| Spec Vol. (all four) | | 1.99 cc/g | | |
| Lightness (all four) | | 2.36 cc/g | | |

The muffins exhibited acceptable taste and mouth feel.

Example 4

The dimagnesium phosphates of this invention were tested as the acid factor in a leavening system of a biscuit mix. A commercially available baking mix from Continental Mills sold under the Krusteaze trademark, without leavening system, was prepared as follows:

To a mixing bowl was added about 240.08 g of Krusteaze Buttermilk Baking Mix formulation. Separately, 3.45 g of sodium bicarbonate, Grade 2, 2.16 g of Py-Ran and 4.31 g of dimagnesium phosphates of this invention (15% LOD, NV 40 substantially less than or equal to 44 micron particle size) were placed into a tared boat. The mixture of leavening acids and soda were sprinkled over the mix and incorporated with a whisk (20 strokes). Then ⅔ cup of milk was added and the mixture stirred with a wooden spoon for 1-2 minutes. The dough was kneaded on a lightly floured board for 15 seconds. The kneaded dough was then rolled out and folded in half once, turned one quarter turn and then rolled to thickness (1.0 cm.) using guides. Four biscuits were cut from the dough and weighed, then place on a baking pan. The remainder of the dough was cut into biscuits and placed on another pan in a group of four. The biscuits were then baked for 10-12 minutes at 425° F.

Texture was measured by cutting the biscuits in half and measuring at the cut surface of the lower half as described above in Example 2. Employing a universal indicator solution, the pH of the biscuits was 7.0-7.4. The data obtained by the procedures described above in Example 2 are noted below in Table V. Height is for individual biscuits. Specific volume is determined as described above and is reported for all four biscuits together. Diameter is reported for four biscuits placed side by side.

TABLE V

| Biscuit | No. 1 | No. 2 | No. 3 | No. 4 |
|---|---|---|---|---|
| Texture-Pan 1 | 2.6 | 2.6 | 3.2 | 3.3 |
| Height (cm) | | | | |
| -Pan 1 | 3.89 | 3.82 | 3.83 | 3.52 |
| -Pan 2 | 3.72 | 3.73 | 3.72 | 3.95 |
| Diameter (cm) | | | | |
| -Pan 1 | | 20.2 | | |
| -Pan 2 | | 20.4 | | |
| Spec Vol. | | | | |
| -Pan 1 | | 2.05 cc/g | | |
| -Pan 2 | | 2.05 cc/g | | |

Example 5

The dimagnesium phosphates of this invention were tested as the acid factor in a leavening system of a white cake mix. A cake was prepared as follows:

To a mixing bowl were added about 652.8 g of Roland A-1 Cake Mix formulation, 5,293 g of sodium bicarbonate, Grade 2, 1,323 g of Py-Ran, and 10.586 g of dimagnesium phosphates of this invention (15% LOD, NV 40 substantially equal to or less than 44 micron particle size). The dry ingredients were blended for 5 minutes and then 83 g of water were added. The mixture was blended together after which an additional 99 g of water was added. Typical mixing was completed after about 2 minutes with scraping of sides and bottom to assure uniform mixing of the ingredients. An additional 74 g of water were then added followed by another minute of mixing and an additional 74 g of water were added followed by more mixing. A total of 330 g of water was added. A portion of the batter was taken to determine specific gravity and a batter expansion test as described in Example 2 above.

About 420 g of batter were placed in each of two 8 inch diameter cake pans with liner. The cakes were baked in an oven at 350° F. for 33 minutes then allowed to cool for 30 minutes before evaluation. The pH of the cake as indicated by a universal pH indicator was 7.5. The data obtained in the evaluation is presented below in Table VI. Texture was measured in three areas on the inner surface of the cut surface of the cake which was cut in half. Specific gravity of the batter was 0.832 g/cc. Specific volume was determined on the individual cakes as described in Example 3 and 4 above. The AACC Template method for evaluating layer cakes is referenced in American Assoc. of Cereal Chemists Standard Methods, Method No. 10.91.

TABLE VI

| Cake Batter Expansion | 5 Min. | 10 Min. | 15 Min. | 30 Min. |
|---|---|---|---|---|
| % Expansion | 1.8 | 7.0 | 8.0 | 9.0 |
| Texture (inside) | | left | right | center |
| Cake No 1 | | 6.1 | 6.4 | 7.0 |
| Cake No 2 | | 7.3 | 5.9 | 5.7 |
| AACC Template A&E | | B | C | D |
| Cake No.1 186 | | 32 | 39 | 34 |
| Vol. Index (B + C + D) | | | 105 | |
| Symmetry (2C − B − D) | | | 12 | |
| Uniform (B − D) | | | −2 | |
| Shrink Pan - Dia. | | | 17.2 | |
| Specific Vol. | | | | 2.62 cc/g |

There is provided in accordance with this invention a leavening system which is substantially free of or greatly reduced in sodium level. The baked goods of this invention are also fortified with magnesium and phosphorus, essential nutrients for human health.

While this invention has been described with reference to specific examples and materials, it is evident that numerous variations can be made in the practice of this invention, which variations may maintain the essential features of the present invention and are therefore within the scope of the invention.

What is claimed is:

1. A leavening composition comprising a carbonate factor and a mixture comprising dimagnesium phosphate trihydrate, amorphous dimagnesium phosphate and a minor amount of magnesium pyrophosphate.

2. The leavening composition of claim 1 wherein the carbonate factor is sodium bicarbonate.

3. The leavening composition of claim 1 wherein the carbonate factor is selected from the group consisting of potassium bicarbonate, ammonium bicarbonate and stabilized x-ray amorphous calcium carbonate.

4. The leavening composition of claim 1 wherein the pyrophosphate content of the dimagnesium phosphates is less than about 5% of the total $P_2O_5$.

5. A process of leavening a fresh, refrigerated or frozen dough product which comprises mixing flour, water and shortening and a leavening system comprising a carbonate factor and a mixture comprising dimagnesium phosphate trihydrate, amorphous dimagnesium phosphate and a minor amount of magnesium pyrophosphate.

6. A process of claim 5 wherein the carbonate factor is selected from the group consisting of sodium bicarbonate, stabilized x-ray amorphous calcium carbonate, ammonium bicarbonate and potassium bicarbonate.

7. The process of claim 5 wherein the carbonate factor is sodium bicarbonate.

8. A fresh, refrigerated or frozen dough product comprising a mixture of flour, a suitable liquid, shortening, and a leavening system comprising a carbonate factor and a mixture comprising dimagnesium phosphate trihydrate, amorphous dimagnesium phosphate and a minor amount of magnesium pyrophosphate.

9. A fresh, refrigerated or frozen dough product of claim 8 wherein the carbonate factor is sodium bicarbonate.

10. A fresh, refrigerated or frozen batter product comprising a mixture of flour, a suitable-liquid, a suitable fat substitute and a leavening system comprising a carbonate factor and a mixture comprising dimagnesium phosphate trihydrate, amorphous dimagnesium phosphate and a minor amount of magnesium pyrophosphate.

11. A fresh, refrigerated or frozen dough product of claim 8 wherein the carbonate factor is selected from the group consisting of sodium bicarbonate, potassium bicarbonate, ammonium bicarbonate and stabilized, x-ray amorphous calcium carbonate.

12. A refrigerated or frozen dough of claim 11 selected from the group consisting of roll dough, biscuit dough, pizza dough and cookie dough.

13. A fresh, refrigerated or frozen batter product comprising a mixture of flour, a suitable liquid, shortening, and a leavening system comprising a carbonate factor and a mixture comprising magnesium phosphate trihydrate, amorphous dimagnesium phosphate and a minor amount of magnesium pyrophosphate.

14. A fresh, refrigerated or frozen batter product comprising a mixture of flour, a suitable liquid, a fat substitute and a leavening system comprising a carbonate factor and a mixture comprising dimagnesium phosphate trihydrate, amorphous dimagnesium phosphate and a minor amount of magnesium pyrophosphate.

15. A batter product of claim 13 comprising a refrigerated or frozen batter for baked goods selected from the group consisting of pancake, cake, muffin, waffle and corn bread batters.

16. A dry mix product comprising a mixture of flour, shortening, and leavening system comprising a carbonate factor and a mixture comprising dimagnesium phosphate trihydrate, amorphous dimagnesium phosphate and a minor amount of magnesium pyrophosphate.

17. A leavened baked good wherein the leavening system comprised a carbonate factor and a mixture comprising dimagnesium phosphate trihydrate, amorphous dimagnesium phosphate and a minor amount of magnesium pyrophosphate.

18. A leavened baked good of claim 17 selected from the group consisting of cakes, pancakes, hush puppies, cookies, waffles, pizza, muffins, crackers, biscuits, corn bread, corn muffins and doughnuts.

19. A dry mix product comprising a mixture of flour, a suitable fat substitute, and a leavening system comprising a carbonate factor and a mixture comprising dimagnesium phosphate trihydrate, amorphous dimagnesium phosphate and a minor amount of magnesium pyrophosphate.

20. A composition comprising dimagnesium phosphate trihydrate, amorphous dimagnesium phosphate and a minor amount of magnesium pyrophosphate wherein the amorphous dimagnesium phosphate comprises from about 33 percent to about 66 percent of the composition by weight.

21. A composition comprising dimagnesium phosphate trihydrate, amorphous dimagnesium phosphate and a minor amount of magnesium pyrophosphate wherein the amorphous dimagnesium phosphate comprises from about 33 to about 75 percent of the composition by weight.

* * * * *

UNITED STATES PATENT AND TRADEMARK OFFICE
CERTIFICATE OF CORRECTION

PATENT NO. : 5,405,636
DATED : April 11, 1995
INVENTOR(S) : David R. Gard et al

It is certified that error appears in the above-identified patent and that said Letters Patent is hereby corrected as shown below:

In column 3, line 47, delete "H2" and insert --$H_2O$-- therefor

In column 14, line 24, delete "magnesium" and insert --dimagnesium-- therefor.

Signed and Sealed this

First Day of August, 1995

Attest:

BRUCE LEHMAN

*Attesting Officer*    *Commissioner of Patents and Trademarks*